(12) United States Patent
Sjödén et al.

(10) Patent No.: US 9,303,411 B2
(45) Date of Patent: Apr. 5, 2016

(54) SURFACE COVERING SYSTEM AND METHOD FOR PRODUCING SUCH A SYSTEM

(71) Applicant: Grade Group AS, Oslo (NO)

(72) Inventors: Tord Sjödén, Järfälla (SE); Ulf Boart, Trångsund (SE); Morten Gustavson, Landskrona (SE)

(*) Notice: Subject to any disclaimer, the term of this patent is extended or adjusted under 35 U.S.C. 154(b) by 0 days.

(21) Appl. No.: 14/541,357

(22) Filed: Nov. 14, 2014

(65) Prior Publication Data
US 2015/0068145 A1 Mar. 12, 2015

Related U.S. Application Data

(63) Continuation of application No. PCT/SE2013/050544, filed on May 15, 2013.

(51) Int. Cl.
| | | |
|---|---|---|
| E04F 15/00 | (2006.01) | |
| E04F 15/02 | (2006.01) | |
| E04F 15/18 | (2006.01) | |
| E04B 5/02 | (2006.01) | |
| E04B 5/00 | (2006.01) | |
| E04D 3/24 | (2006.01) | |
| E04D 13/04 | (2006.01) | |
| A47K 3/40 | (2006.01) | |
| E04F 15/08 | (2006.01) | |

(52) U.S. Cl.
CPC ............. *E04F 15/02188* (2013.01); *E04B 5/02* (2013.01); *E04C 1/24* (2013.01); *E04D 3/24* (2013.01); *E04D 13/0481* (2013.01); *E04F 15/182* (2013.01); *A47K 3/40* (2013.01); *E04F 15/08* (2013.01); *E04F 2203/02* (2013.01); *E04F 2290/023* (2013.01)

(58) Field of Classification Search
CPC . E04F 15/02188; E04F 15/088; E04F 15/182; E04F 2290/023; E04C 1/24
USPC .................. 52/302.1, 302.3, 302.4, 177
See application file for complete search history.

(56) References Cited

U.S. PATENT DOCUMENTS

| 3,387,420 A | * | 6/1968 | Long ....................... 52/302.3 |
| 4,503,644 A | | 3/1985 | Coutu, Sr. |
| 5,699,643 A | * | 12/1997 | Kinard ..................... 52/742.14 |

(Continued)

FOREIGN PATENT DOCUMENTS

| CA | 2521801 | 3/2006 |
| DE | 3411039 | 11/1985 |

(Continued)

*Primary Examiner* — Brian Glessner
*Assistant Examiner* — Paola Agudelo
(74) *Attorney, Agent, or Firm* — Gabriela B. Tomescu

(57) ABSTRACT

The invention relates to a surface covering system intended for a surface in the form of a wet room floor, a roof or another substantially flat, delimited surface which is exposed to water and needs drainage, and to methods for preparing such a system. The surface covering system comprises at least one plate with a mark showing a drainage point and a substantially flat lower surface and an upper surface with a first decline towards the mark. The invention is characterized by that the first decline is circular and has a radial slope (α) directed towards the mark from every point on the at least one plate. The decline creates a cavity in the plate in the shape of at least a part of a blunt virtual cone with the apex of the cone directed towards the mark, achieving a modular surface covering system with an even circular decline.

8 Claims, 6 Drawing Sheets

(56) References Cited

U.S. PATENT DOCUMENTS

| | | | |
|---|---|---|---|
| 6,058,659 A * | 5/2000 | Astrom | 52/34 |
| 6,088,984 A * | 7/2000 | Kirby | A47K 3/40 |
| | | | 404/2 |
| 6,155,015 A * | 12/2000 | Kirby | E04H 4/1236 |
| | | | 264/271.1 |
| 8,365,487 B2 * | 2/2013 | Krusec | E04D 13/1693 |
| | | | 52/11 |
| 2006/0101777 A1 * | 5/2006 | Lapointe | 52/734.2 |
| 2008/0016614 A1 * | 1/2008 | Daniels | 4/613 |
| 2008/0276557 A1 * | 11/2008 | Rapaz | 52/302.3 |
| 2012/0272449 A1 * | 11/2012 | Wedi | A47K 3/1605 |
| | | | 4/613 |
| 2013/0227903 A1 * | 9/2013 | Amend | 52/309.4 |

FOREIGN PATENT DOCUMENTS

| | | |
|---|---|---|
| DE | 19753527 | 6/1998 |
| EP | 2116664 | 11/2009 |

\* cited by examiner

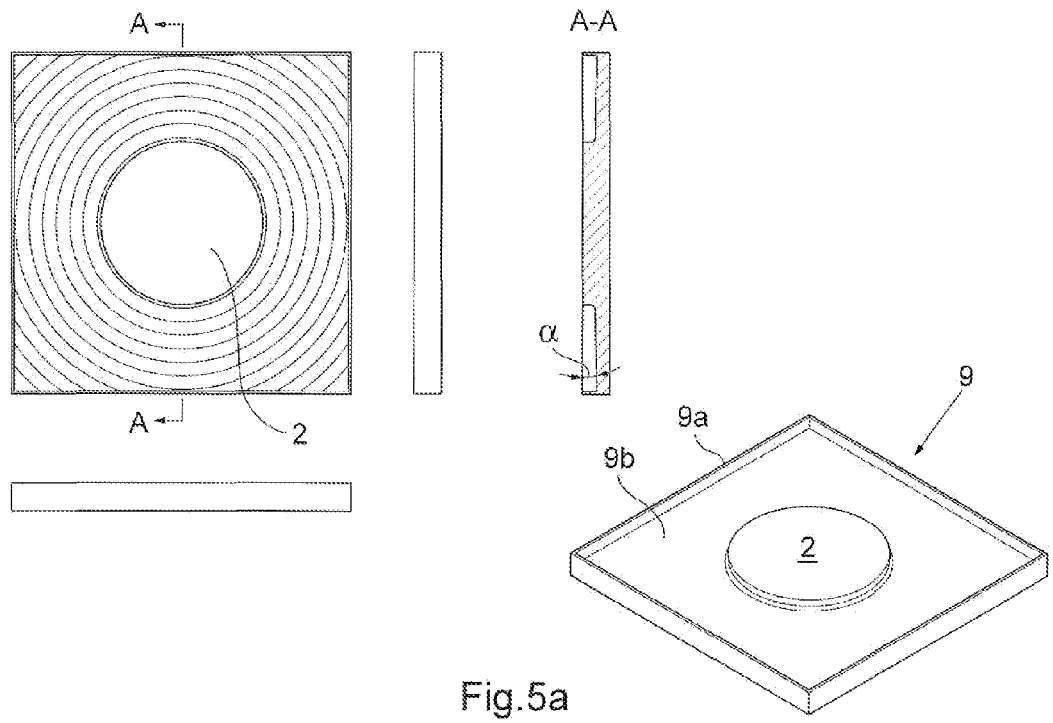
Fig.5a
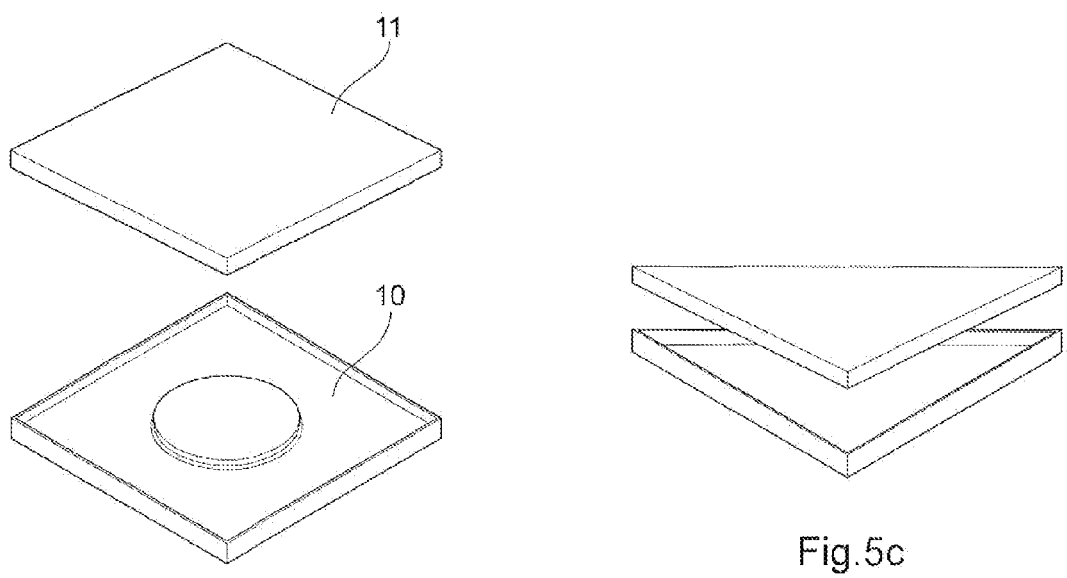
Fig.5b
Fig.5c

SURFACE COVERING SYSTEM AND METHOD FOR PRODUCING SUCH A SYSTEM

This application is a continuation of PCT Application No. PCT/SE2013/050544, filed May 15, 2013, which claims priority of SE 1350095-4, filed Jan. 29, 2013, and SE 1250734-9, filed Jun. 29, 2012, and SE 1250504-6 May 16, 2012, the entire contents of each of which are hereby incorporated by reference.

BACKGROUND

The present invention relates generally to a surface covering system intended for covering a floor, a roof or another substantially flat, delimited surface which may be exposed to a falling fluid and thus needs drainage. The system comprises plates with a prefabricated decline towards a draining sewer. The invention also relates to methods for preparing such a system.

In order for water or other fluid, such as oil and similar, not to collect on a surface, a decline towards a draining sewer is needed. The surface may for example be a support in the form of a flat roof, the ground surface on an inner yard, the floor in a garage, a kitchen or a wet room, such as a bathroom, a shower room or a laundry room or another substantially flat, delimited surface which may be exposed to water in the form of rain or dripping water and which thus needs drainage.

For example in a wet room the common way to achieve a decline towards the drainage point, in this case a floor drain, is to create the decline using liquid filler. This method has a number of disadvantages, including great time consumption, lifting of many heavy objects by the builder and difficulties in achieving an even decline. There will often be uneven places and inverse declines somewhere on the floor, giving rise to water puddles. It also becomes unnecessarily difficult to put floor clinkers on the filler treated floor, because the clinkers must be cut in order to give even joints.

To simplify the building of surfaces needing drainage, a number of systems are available on the market, consisting of one or more plates with a prefabricated decline, which are put side by side on a flat surface.

In U.S. Pat. No. 7,979,927 B2 a method is shown, for example, where a floor decline is prefabricated starting from the placement of the sewer and where a number of square prefabricated elements are joined together by hooking them to one another and a decline is milled starting from the floor drain. The decline milled in each plate is a so-called envelope decline, i.e. it is flat and sloping towards the floor sewer. This means edges are created between every milled plate. These edges complicate the laying of clinkers on the floor and are uncomfortable to stand on.

In EP 12 769 490 A1 another prefabricated wet room floor or roof is shown, where a number of plates shaped like a circle sector together give a circular decline starting from the sewer. The system is founded on a number of segments, identical for each circular turn, being laid out around a central circular segment, placed over the sewer. The floor is laid starting from the sewer and then built up one turn at a time outwards in the room. At the walls the segments are cut to the proper shape. The cutting thus must be made in situ in the wet room. This cutting is time consuming, and there will be a great deal of waste that must be disposed of.

SUMMARY OF INVENTION

An object of the present invention is to provide a surface covering system including prefabricated building elements, with which a surface can easily and quickly be constructed having a sufficient drainage of water and an even decline towards a draining sewer.

This object is achieved by means of a surface covering system intended for covering a floor, a roof or another substantially flat, delimited surface according to Claim 1, comprising at least one substantially rectangular, triangular, square or otherwise polygonal plate with a mark showing a drainage point and a substantially flat lower surface and an upper surface with a first decline towards the mark. The invention is characterised by the first decline being circular and having a radial slope directed towards the mark from every point on the at least one plate. The decline thus creates a cavity in the plate, which has the shape of at least a part of a blunt virtual cone with the apex of the cone directed towards the mark.

By this solution a surface covering system is achieved, comprising at least one prefabricated plate having an even circular decline starting from the placement of the drainage point/points in a specific room. The advantages of an even circular decline is on the one hand that it slopes by exactly the same amount towards the drainage point from every point in the whole room, on the other that the surface can be coated with e.g. stone or ceramic tiles giving even joints without need for cutting the tiles, which saves considerably on time. An even decline also simplifies covering the surface with asphalt, roof boarding, cardboard or cloth with felt, which is done if the surface covering system is a roof or an inner yard. The placement of the drainage point thus determines the shape of each plate segment, and each plate segment is unique and intended for a specific delimited surface. Centred on the mark for the drainage point an opening is preferably arranged, acting as a drainage sewer. One plate can be used as a wet room plate intended for a limited space in a bathroom, for instance a shower area.

According to a first embodiment the surface covering system comprises at least two separate plates, intended to be arranged side by side. At least one of the plates has a mark showing a drainage point, and both the at least two plates have an upper surface with a first common circular decline with a radial slope directed towards the mark when the plates are arranged side by side.

By using at least two plates a larger modular surface covering system with a common decline towards a floor drain can be manufactured without difficulties in transporting the system and laying it in place. Nevertheless, it is suitable to use as low a number of plates as possible for a specific limited surface.

According to one embodiment the upper surface of at least one side edge of each plate is bevelled, which gives a bevelled notch in the joint achieved between the plates when the plates are arranged side by side.

The bevelled notch can be filled with e.g. liquid filler. If liquid filler is arranged in the joints between the plates as well as on the upper surfaces of the plates, the separate plates are moulded together to one single unit.

According to another embodiment there is locally, closest to the drainage point, a second circular decline, which has a second slope, larger than the first slope of the first circular decline. The second decline with this second slope extends preferably from the mark to a virtual circle line arranged at a distance from the mark corresponding to a radius of up to 500 mm.

By having a larger decline closest to the drainage point a better drainage is achieved locally around this point. The local fast drainage prevents water from collecting in the vicinity of the drainage point, which may for instance be at the feet of the person using the shower in a wet room.

According to one embodiment grooves are arranged in the upper surface and/or the lower surface of the at least one plate. At least two grooves may be arranged crossing each other to give a chequered pattern. A device for heating, e.g. underfloor heating, and/or for reinforcement, e.g. reinforcement bars, may be placed in at least one of the grooves. It is also possible to fill the grooves with liquid filler.

Grooves arranged in the upper surface can be used for underfloor heating, and grooves arranged in the lower surface can be used for ventilating away moisture that may appear between the underfloor and the surface covering system. The grooves for underfloor heating are preferably arranged in a chequered pattern that follows the floor slope fully. It is also possible to arrange the grooves in the upper surface before the decline is created. In this embodiment the chequered pattern does not follow the slope of the floor but is flat. If the grooves are filled with liquid filler, the heat from the underfloor heating coils is distributed evenly over the floor, as liquid filler leads heat much better than the plate material.

The invention further relates to a method for preparing a surface covering system comprising at least one plate with a decline towards a mark which marks a drainage points according to any of the above embodiments characterized in that the preparation of the decline on the at least one plate is done by any of the following manufacturing methods milling, hot pressing, compression moulding or casting of the at least one plate.

An advantage of the above method for preparing a surface covering system is that a circular decline with an even slope can be prepared without any complicated manufacturing process for the one or more prefabricated plates comprised in the system.

In one embodiment the method is characterised in that it comprises the steps of:
  placing at least one plate on a work table,
  making a mark for at least one drainage point on the at least one plate,
  determining the desired slope of an upper surface of the at least one plate directed towards the mark on the basis of information about the desired size of the surface to which the system is to be adapted, the thickness of the plates and the position of the drainage point,
  machining the desired slope on the upper surface of the at least one plate.

According to one embodiment, the decline is machined with circular or linear movements starting from the mark. If the decline is machined with circular or linear movements starting from the mark, for instance with a milling machine, each floor can be specially made according to the desires of the customer.

The mill may advantageously be a programmable 5-axis mill. The mill is preferably programmed with information about the desired size of the surface to which the system is to be adapted, the thickness of the plates and the position of the drainage point.

By using for instance a milling machine comprising a milling spindle tilted to the desired slope and pointing the lowest point of the milling head towards the mark for the drainage point, the manufacturing process may be simplified further. If a programmable 5-axis mill is used, the manufacturing process is faster, and the lead times are diminished. The mill is preferably provided with information from a platform programmed with information about the desired size of the surface to which the system is to be adapted, the thickness of the plates and the intended position of the drainage point. The platform is chosen according to the intended number of drainage points of the surface covering system.

In another embodiment the method is characterised by it comprises the steps of:
  choosing a first mould which comprises an inner volume, at least partly corresponding to the volume of the at least one plate,
  supplying material in an amount corresponding to the at least one plate to the mould.

According to one embodiment, the preparation of the at least one plate is achieved by any one of the preparation methods hot pressing, compression moulding or casting of the at least one plate.

According to one embodiment, the chosen mould is single or double and comprises at least a mould part including a surface having a determined desired radial negative slope ($\alpha$, $\beta$) in the direction away from the mark, which marks the drainage point, towards the outer edges of the mould and where the marking is arranged protruded in relation to the edges of the mould. I.e. the mould comprises the projecting part with negative slope (virtual cone) which will create the circular decline. A single mould is preferably used in casting, wherein the first mould part is used as the lower part, and a double mould is preferably used in compression moulding or hot pressing.

According to a second embodiment the method further comprises the steps of choosing also at least one second mould, the inner volume of which corresponds to the volume of a second separate plate, which has a decline common with the second plate and to supply material to the second mould in an amount regarding the second plate.

If compression moulding or hot pressing is used as preparation method, at least one of the mould parts may be used in prefabrication/manufacturing of several of the plates that together constitute the surface covering system. In the case of larger systems, for instance comprising square plates with one plate having a centrally placed drainage point, the whole mould, i.e. both the first and the second mould part, can be used for making several plates, because several plates here have the same decline. Preferably, at least four plates have the same decline.

According to another embodiment the outer dimensions of the at least one mould are the same as the outer dimensions of the at least one second mould.

According to another embodiment, any one of the above methods also comprises the steps of creating a hole for a drainage sewer, centred around the mark for the drainage point, and/or of machining grooves in the upper surface and/or the lower surface of the at least one plate, which extend over the whole of that surface.

By making holes for the drainage sewer and possibly also for drainage pipes and the like as early as during the manufacturing of the surface covering system, and by also machining grooves that can be used e.g. for underfloor heating and adapting the outer dimensions of the plate, as little as possible needs to be done in situ when the system is installed. This reduces the amount of waste that is otherwise produced in the making of holes and cutting. The waste produced in the factory during manufacturing of the system can be taken charge of directly and be recycled or used in new plates.

All the above embodiments or parts of an embodiment can be combined freely, as long as the combination does not give rise to contradictions.

BRIEF DESCRIPTION OF DRAWINGS

The invention is now described, by way of example, with reference to the accompanying drawings, in which:

FIG. 1b shows a section A-A of FIG. 1a.

FIG. 2b shows a section A-A of FIG. 2a.

FIGS. 5a, 5b and 5c show moulds belonging to two different manufacturing methods.

DESCRIPTION OF EMBODIMENTS

In the following, a detailed description of embodiments of the invention is given. All examples are to be considered parts of the general description, and they are thus in general possible to combine.

The surface covering system will be described below as a floor system for a wet room, but it is of course possible to use the system to create drainage on other substantially flat, delimited surfaces, for instance on roofs or inner yards.

Figure 1A:
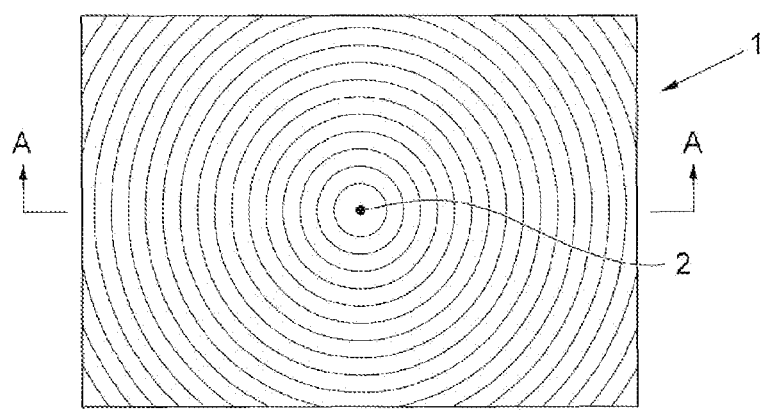
FIG. 1a shows a first embodiment of the invention as a plane view.
Figure 1B:
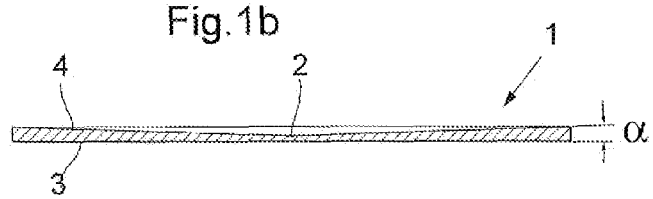
Figure 1C:
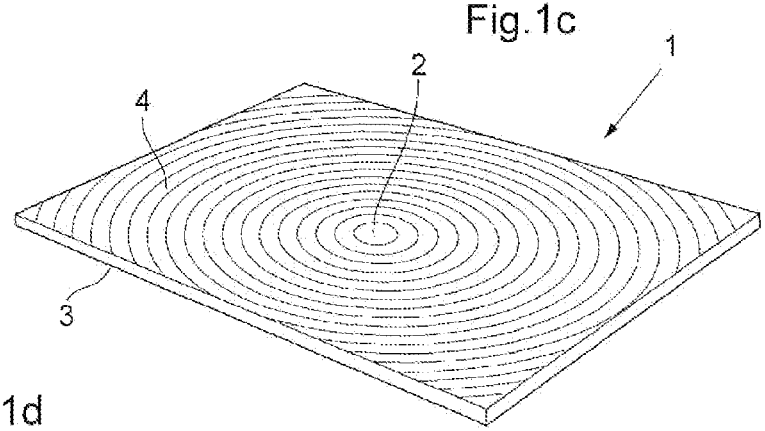
FIG. 1c shows a perspective view of the invention according to the first embodiment.

FIGS. 1a-1c show a first embodiment of the floor system, which comprises a plate 1 with a mark 2 for a drainage point in the form of a floor drain. The mark 2 may also be the drainage point/floor drain as such. The mark 2 is in this embodiment centred on the plate 1, but it may also be placed at another suitable place away from the edge of the plate, e.g. 450 mm to 600 mm in on the plate. The plate is in this embodiment rectangular, but it may also be substantially rectangular (for instance square), triangular, quadrangular or have another polygonal shape. The terms substantially rectangular, triangular, quadrangular or polygonal also include plates comprising different shaping or connecting details arranged in the edges of the plate to permit joining or connecting several plates to one another.

Figure 1D:
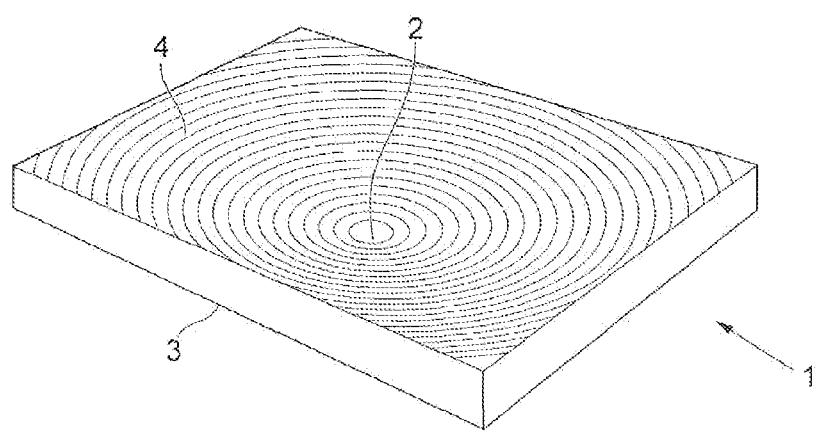
FIG. 1d shows a perspective view of the invention with exaggerated dimensions.

At the mark 2 a hole will be arranged, where the floor drain or another drainage device is mounted. The centre of the hole for the floor drain should be at the centre of the mark. The plate 1 has a substantially flat lower surface 3 and an upper surface 4 with a decline directed towards the mark 2. The decline is circular and has a radial slope α towards the mark from every point on the at least one plate, so that the decline creates a cavity in the plate 1 in the shape of at least a part of a blunt cone with the apex of the cone directed towards the mark 2. As the plate has a polygonal shape, the cavity in the shape of a cone is truncated in its periphery, i.e. the straight edges of the plate end the circular decline, see FIG. 1c. In FIG. 1d the thickness of the plate is exaggerated to make the conical shape of the cavity clear.

The plates may be made from e.g. expanded polystyrene of the EPS or XPS type or polyamide plastics (PA), polypropene (PP) or polyurethane (PUR). The plate material may also be glass foam or any other plate material, suitable for the purpose. In additional embodiments plates with a circular decline are cast from concrete or another material suitable for casting. It is also possible to compression mould or hot press the plates from other materials, suitable for these manufacturing processes.

The plates which are used as separate parts in the surface covering system are substantially flat on the lower side and thus intended to be put on a flat substrate. It is advantageous to use EPS plates with dimensions up to 1200 mm×3000 mm or XPS plates with dimensions up to 600 mm×3300 mm, but it is of course also possible to use plates with any other dimensions. Square plates may for instance be suitable for assembling reasons.

Plates made from a water impermeable material, for example polyamide plastics (PA) or polypropene (PP), may be preferable when they are intended to be placed for instance in a wet room or an inner yard. The plates as such may then act as moisture barriers against the underlying floor structure, and sealing is only needed along the walls or edges and along any joints between the plates.

Figure 2A:
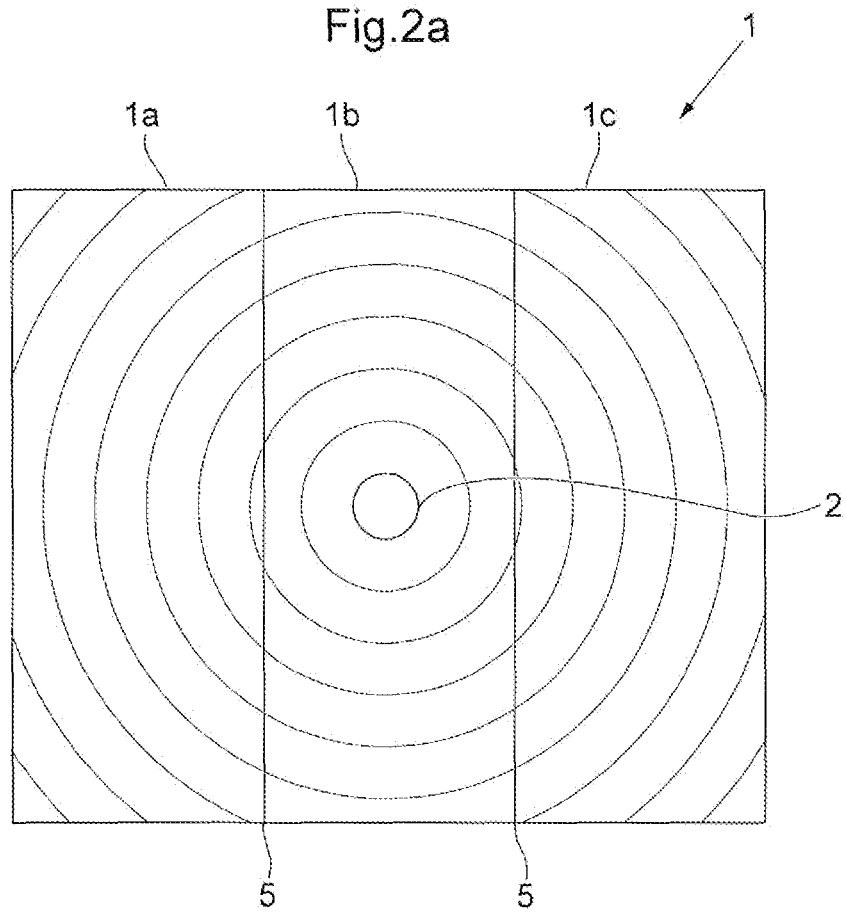
FIG. 2a shows a second embodiment of the invention as a plane view.
Figure 2B:
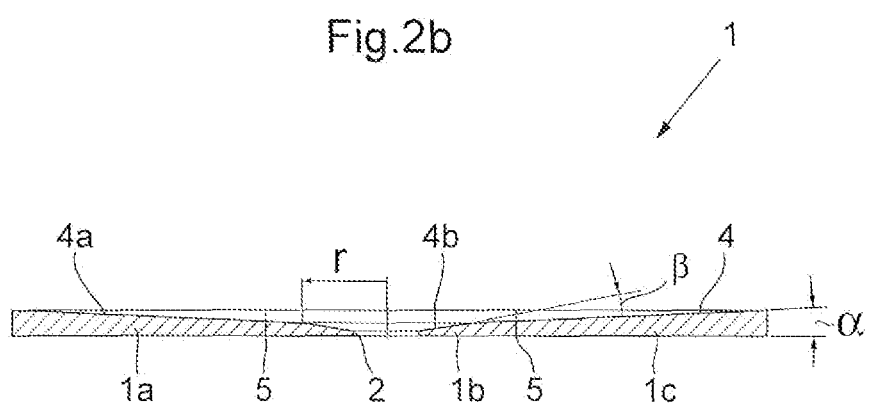

FIGS. 2a and 2b show another embodiment of the invention, wherein the floor system comprises three separate rectangular plates 1a, 1b, 1c, placed side by side in order to jointly form the upper surface/floor surface 4 of the wet room. More than three plates may of course also be used. The plates can be fastened together with glue or other fastening means, or they can be fastened to the floor side by side. The joints 5 between the plates may be sealed with some kind of sealing tape. It is also possible to lay a sealing layer or a steam impermeable cloth on the entire floor.

One of the plates, in this case the middle plate 1b, but it can of course also be any one of the other plates 1a, 1c, has a mark 2, which is in this case a cut for a floor drain. The hole can also be milled or produced in any other way when the floor system is manufactured or when the floor is laid in place at the building area. The floor surface 4 has a first circular decline with a radial slope α directed towards the floor drain mark 2. Locally closest to the floor sewer mark, preferably at a radius r up to 500 mm from the middle of the sewer, there is a second circular decline having a greater slope β than the first decline α. For a wet room, the first radial slope α is preferably in the range of 2-10 mm/m and the second radial slope β in the range of 7-20 mm/m. For other substantially flat, limited surfaces, such as roofs and inner yards, the slope directed towards the drainage sewer may be in other ranges.

As the floor surface 4 consists of several plates, in this case three, the separate plates 1a, 1b, 1c have an upper surface 4a, 4b, 4c with parts of the common circular decline. The middle plate 1b comprises the hole for the floor sewer, and the circular decline around this forms a cavity in the shape of a cone with its apex directed towards the centre of the hole for the floor sewer. The two outer plates 1a, 1c comprise a decline forming a cavity in the plates 1a, 1c in the shape of a part of a blunt cone, because the cone is truncated in one or both sides.

Figure 3A:
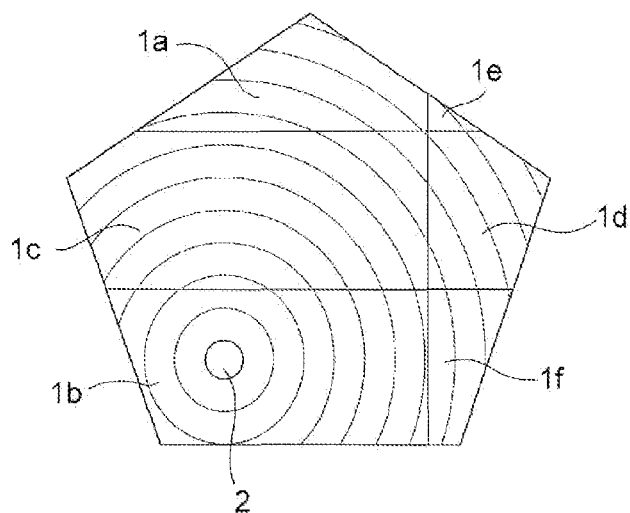
FIGS. 3a-3c show some possible shapes of the surface covering system, adapted to different dimensions of the surface to which the system is intended to be adapted.
Figure 3B:
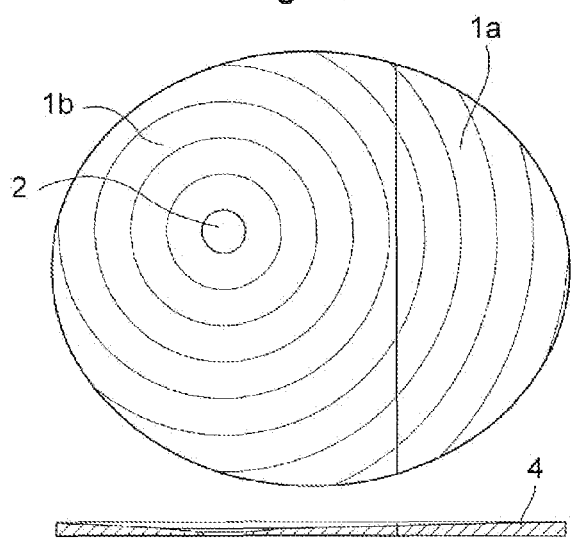
Figure 3C:
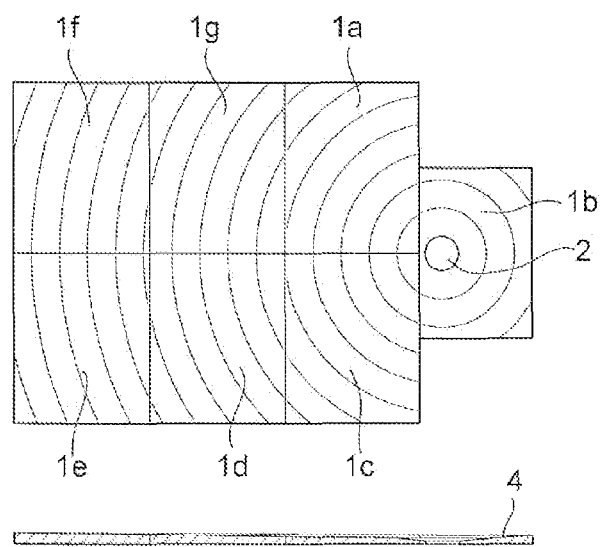

FIGS. 3a-3c show three different irregularly shaped bathroom floors, built with the floor system according to the invention. The floor systems shown in FIGS. 3a-3c are all built from one or several rectangular plates 1a, 1b, 1b', 1c, 1d with an upper floor surface 4 having a circular decline directed towards a floor sewer. The outer edges of the floor are cut to the desired shape. Irrespective of how the bathroom floor looks, no cutting in situ is needed. The plates can be specially made according to the shape of the floor even in the factory.

Figure 4A:
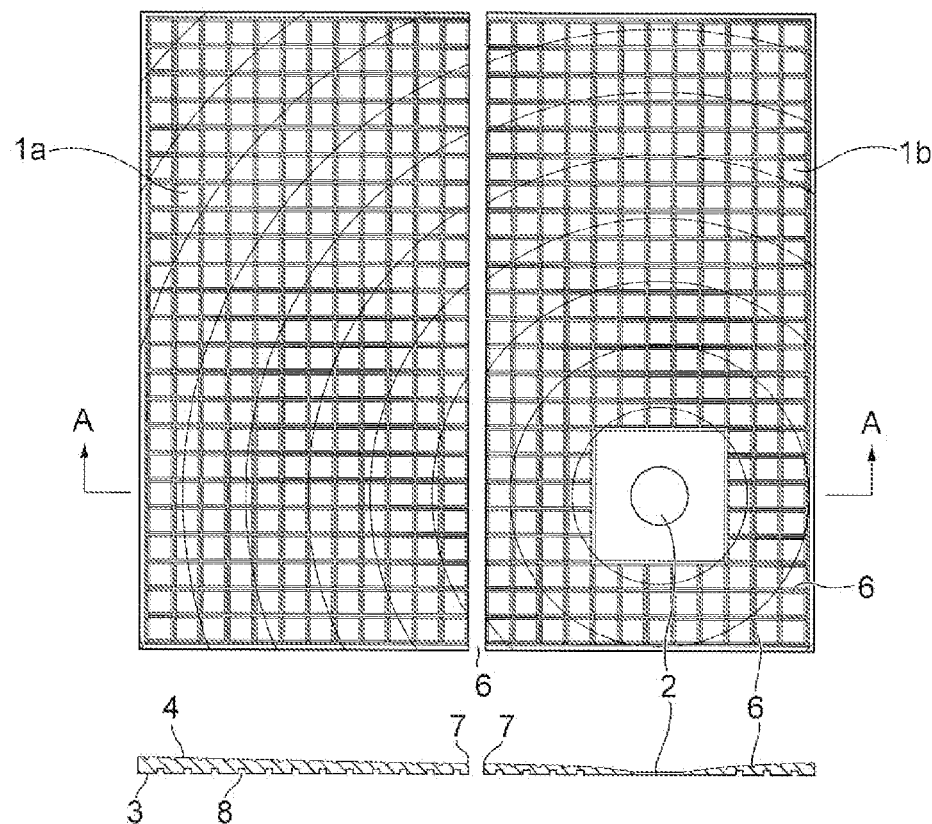
FIGS. 4a and 4b show a third embodiment with cuts for underfloor heating and/or ventilation.
Figure 4B:
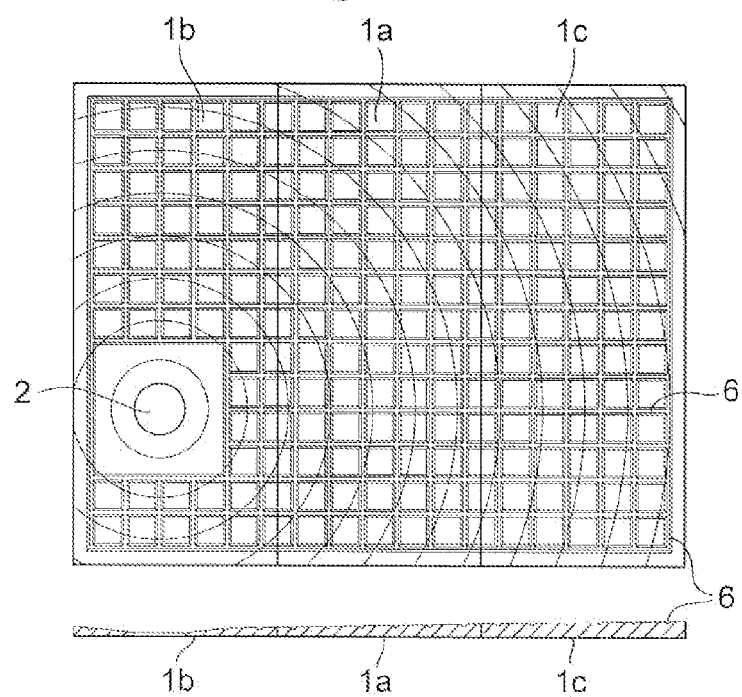

FIGS. 4a and 4 show an embodiment of a floor system with machined grooves 6 arranged in the upper surface 4 of the plates 1. The grooves are in this embodiment created in a chequered pattern, which can extend out to the edges of the plate (FIG. 4a) or end some way from the edge (FIG. 4b). In the grooves a cable or a tube (not shown) for underfloor heating may be placed. The underfloor heating coils are cast in place with liquid filler. As the grooves cross one another and are filled with heat dissipating liquid filler, the heat from the underfloor heating coils is distributed evenly on the floor.

It is also possible to arrange the grooves 6 in a chequered pattern to match a reinforcement device, e.g. a prefabricated reinforcement carpet or separate reinforcement bars laid in the grooves 6 one by one or bound to each other. If a reinforcement device is used the entire construction becomes stronger, and the separate plates are held together. When the reinforcement carpet is laid in the grooves these can be filled with e.g. liquid filler or concrete. These grooves can of course also be machined in the plate shown in FIGS. 1*a*-1*d*. The reinforcement then strengthens the plate as such.

In the embodiment shown in FIG. 4*a* the edges of the plates have a bevelling 7, which may be there from the factory or which may be machined by the machine creating the decline. When the plates 1*a*, 1*b*, 1*c* are put side by side a bevelled notch appears in the joint 6 between the plates. This notch can be filled with e.g. liquid filler. There may thus be liquid filler both in the joints 6 between the plates and on the upper surface 4 of the plates. The separate plates 1*a*, 1*b*, 1*c* are then moulded together to a single unit 1.

It is also possible to machine/mill grooves 8 in the lower surface 3 of the plates 1. These grooves 8 extend preferably right over the entire lower surface 3 of the floor and contribute to the air flow between the underfloor and the floor system. The floor is thus better ventilated and the risk for moisture damage diminished.

It is also possible to instead arrange the at least one plate at a distance from the surface it will cover. The distance between the floor and the plate may be used for ventilation or for electrical wires or water pipes.

The floor system may be manufactured by different machining/manufacturing processes.

It is for instance possible to prefabricate plates with a circular decline by casting the separate plates in one or more moulds, by compression moulding in moulds with t defined inner volume or by plastic deformation of the plates by way of a conically shaped pressing tool under heating, so-called hot pressing.

In manufacturing by casting a single mould 9 is used, preferably made from steel or another suitable material, with a mirror shaped decline. See FIG. 5*a*, showing the centre plate with the mark/hole 2 for the floor drain centrally placed on the plate as a protruding cylinder. Thus, the mould 9 is delimited by a frame 9*a* and a lower frame surface 9*b* having at least one determined desired radial negative slope ($\alpha$, $\beta$) directed away from the protruding mark 2, marking the drainage point, towards the outer, lower placed, edges of the mould. The radial slope corresponds to the decline of the upper surface 4 of the plate.

In other moulds, intended for casting the plates that will be arranged around the central plate 1*b*, there is no protruding part that will give the floor drain, but rather the slope goes from all points on the frame surface and has the desired shape of a part of a virtual, upwards directed, cone, i.e. no part of the lower frame surface is fully flat.

The mould is filled with concrete or another corresponding hardening material with possible reinforcing additives in a suitable way. It is also possible to reinforce the plates with a reinforcing net, reinforcing bars or separate needles or fibres. When the plate is finished, the upper moulding surface becomes the substantially flat lower surface 3 of the plate.

It is also possible to use several materials in the plates. For instance a layer of expanded plastics can be laid on the not fully hardened concrete or be glued onto it later.

In the case of manufacture by compression moulding, see FIGS. 5*b* and 5*c*, a double mould is used, comprising a first part 10 and a second part 11, enclosing an inner volume that at least partially corresponds to the volume of the at least one plate 1, 1*a*, 1*b*, 1*c*. FIG. 5*b* shows the central plate, which also has the mark/hole 2 for the floor drain centrally placed on the plate in the form of a protruding cylinder. FIG. 5*c* shows a triangular double mould that can also be used for manufacturing plates with a circular decline.

The first part 10 of the mould has at least one determined desired radial negative slope ($\alpha$, $\beta$) directed away from the mark 2, marking the drainage point, towards the outer edges of the mould. The second part 11 of the mould has a flat inner surface, corresponding to the substantially flat lower surface 3 of the plate. Preferably the second part 11 of the mould can be used in the manufacture of all separate plates 1*a* to 1*g*. The other moulds, intended for casting the plates that will be arranged around the central plate 1*b*, have no protruding part that will give the floor drain, but rather the slope goes from all points on the frame surface and has the desired shape of a part of a virtual, upwards directed, cone, i.e. no part of the lower frame surface is fully flat. The inner surface of the other moulds have a decline corresponding to the inner surface of the first mould so that a common decline is created.

The plates are manufactured by supplying the material that will constitute the plate to the inner volume between the first and the second parts 10, 11 of the mould. When the material has hardened the first and the second mould parts are separated, and the finished plate with parts of a circular decline is taken out.

In manufacture by way of hot pressing, not shown, for instance a pre-warmed plate of polyamide plastics (PA) or polypropene (PP) is placed in the lower part of a shaping tool. After placing the material batch, the tool is closed and the material is pressed out in the shaping space. When the material has hardened the tool is opened, and the plate with a finished circular decline is taken out.

It is also possible to mill the decline in a flat plate, not shown. If the decline and shape of the floor is milled it is preferably machined with a 5-axis (X, Y, Z, A and C axis) programmable mill with a work area of 3300 mm×5000 mm. The mill comprises a milling spindle that can be tilted to the desired slope. The machine has an automatic tool changer and a vacuum table to keep the plates in place. The Y axis is horizontal in the longitudinal direction of the machine, the X axis is horizontal laterally transversely to the longitudinal direction of the machine and the Z axis extends vertically. Movements around the A axis tilt the milling spindle in a desired degree, and movements around the C axis rotate the spindle around its own axis.

When manufacturing a wet room floor, for instance with the dimensions 2700 mm×3500 mm, that is 9.45 m$^2$, it is preferable to use three plates with the dimensions 1200 mm×3000 mm, which are laid side by side on the work area of the mill. In a computer program a number of platforms are stored, depending on how many sewers the room will have; the great majority of bathrooms have one sewer. The platform is programmed with information about the floor size and the thickness of the plates as well as the placement of the sewer on the floor. The mill is tilted to the desired slope, and its lowest point is directed towards the mark 2 defining the centre of the sewer. The lowest point of the mill is directed towards the mark 2 during the entire work process for creating the decline. The decline is milled by circular or linear movements with a flat mill, and the centre point of the sewer is always the starting point for the movements. When the plates have got their decline, the floor size is milled out from the plates by cutting the edges. The floor may in this step be given different shapes, see FIGS. 3a to 3c. Holes are also milled for the floor sewer and if necessary for draining pipes from toilet and sink. The plates are then marked with a mark corresponding to an attached drawing. The waste produced is recycled.

If the floor is going to have underfloor heating, a chequered pattern may be milled in the upper surface 4 of the floor, which fully follows the slope of the floor. It is also possible to create a flat chequered pattern independent of the upper decline of the floor, which for example makes it possible to use a prefabricated reinforcement net.

The above method is aimed at each floor system being specially manufactured upon ordering, where there is information about the floor size, its shape and the placement of the floor drain.

It is however also possible to manufacture a flexible floor system, where the plates are kept in stock in special sale places and later are adapted to the bathroom of a specific customer, which may be done as follows:

A "floor sewer plate" is designed in at least two varieties. In one of the two varieties the sewer or the mark for the sewer is placed centrally on the plate, in its middle point. In the other variety the sewer or the mark for the sewer is placed e.g. at least one quarter of the way into the plate from one of the plate edges.

Starting from the sewer, the adjoining plates are machined in the way described above.

It is also possible to manufacture and assemble a flexible floor system, where each separate plate is manufactured in a shape having an inner volume that at least partly corresponds to the volume of the at least one plate 1, 1a-1g. This circular multisystem is shown in FIGS. 6a-6c.

Figure 6A:
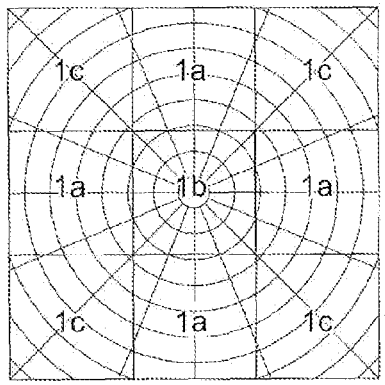
FIGS. 6a-6c show an alternative embodiment of the surface covering system, comprising square plates.
Figure 6B:
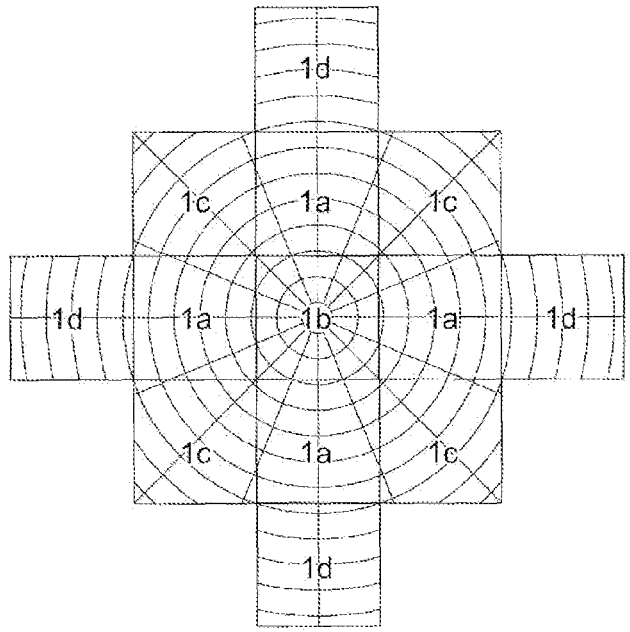
Figure 6C:
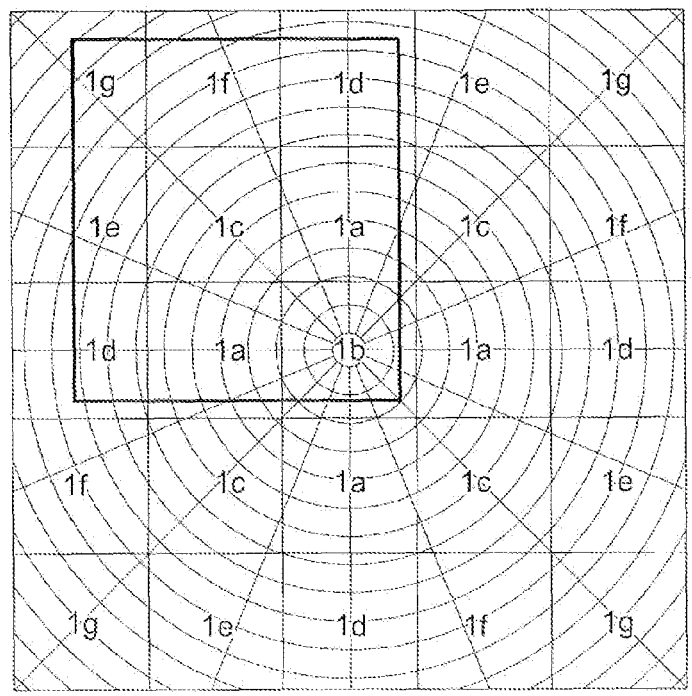

This system is built from substantially square plates 1a-1g, (other shapes of the plates are thus possible) where the floor drain or the mark 2 for the drainage point is centrally placed on a first plate 1b and other plates 1a, 1c-1g continue around the first plate 1b in a radially outward directed pattern, see FIGS. 6a and 6b. The first plate 1b with the floor sewer is manufactured in a mould. As the floor sewer is centrally placed on the first plate 1b, the radial slope of the decline on the other plates is the same for at least four of the other plates 1a, 1c-1g. These at least four additional plates are thus manufactured in a second mould which may be reused to create several plates. This creates a flexible system with a cost effective manufacturing since only a limited amount of moulds are needed. In FIGS. 6a-6c at most seven varieties of plates are shown. The system may of course be enlarged with an unlimited number of plates if desired.

From a system of plates 1a-1g, for instance kept in stock in a sales place, the end customer or contractor on basis of the size of the room and the placement of the floor sewer can choose the number of plates of each shape that are needed to produce the floor. In situ at the building area, in the sales place or in the factory the outer plates are then cut and adapted to the walls of the room, see FIG. 6c.

A central part of the present invention is achieving a prefabricated floor with an even circular decline from every point of the floor surface. The decline starts from the point where the floor sewer is placed, and the floor is to be manufactured with the smallest possible number of rectangular plates. In the above description a floor system with one to three plates is described, but in the case of large wet rooms it is of course possible to use more plates. In production common standard sizes of the plates are preferably used.

The invention claimed is:

1. A surface covering system intended for covering a floor, a roof or a substantially flat, delimited surface, wherein the system comprises at least two separate substantially rectangular, triangular, quadrangular or polygonal plates with a substantially flat lower surface and an upper surface, wherein said plates are intended to be arranged side by side, and of which one plate has a mark showing a drainage point and wherein the at least two plates have an upper surface with a first common circular decline with a radial slope directed towards the mark from every point on the at least two plates, when the plates are arranged side by side, so that the decline creates a cavity in the at least two plates, which has the shape of at least a part of a blunt virtual cone with the apex of the cone directed towards the mark.

2. The surface covering system according to claim 1, wherein the upper surface of at least one side edge of each plate is bevelled, which gives a bevelled notch in the joint achieved between the plates when the plates are arranged side by side.

3. The surface covering system according to claim 1, wherein there is locally, closest to the mark for the drainage point, a second circular decline, which has a second slope ($\beta$), larger than the first slope ($\alpha$) of the first circular decline.

4. The surface covering system according to claim 3, wherein the second decline with a slope ($\beta$) extends from the mark to a radius of up to 500 mm from the mark.

5. The surface covering system according to claim 1, wherein grooves are arranged in the upper surface and/or the lower surface of the at least two plates.

6. The surface covering system according to claim 5, wherein at least two grooves are arranged crossing each other to give a chequered pattern.

7. The surface covering system according to claim 5, wherein a device for heating and/or reinforcement is to be placed in at least one of the grooves.

8. The surface covering system according to claim 5, wherein the grooves are to be filled with liquid filler.

\* \* \* \* \*